June 9, 1942.  H. BERNZOTT  2,285,644
VIEWING DEVICE
Filed March 29, 1940   4 Sheets-Sheet 3

INVENTOR
HUGO BERNZOTT
BY Robert F. Mihle, Jr.
ATTY.

June 9, 1942.  H. BERNZOTT  2,285,644
VIEWING DEVICE
Filed March 29, 1940  4 Sheets-Sheet 4

INVENTOR
HUGO BERNZOTT
BY Robert F. Miehle, Jr.
ATTY.

Patented June 9, 1942

2,285,644

UNITED STATES PATENT OFFICE 2,285,644

VIEWING DEVICE

Hugo Bernzott, Chicago, Ill., assignor to The Bell & Howell Company, Chicago, Ill., a corporation of Illinois Application March 29, 1940, Serial No. 326,707

7 Claims. (Cl. 88—24)

My invention relates particularly to motion picture film viewing means although not limited to this use alone.

The general object of the invention resides in the provision of effective and convenient viewing means which is particularly adapted for viewing motion picture film with the instant purpose of editing the same.

With this object in view my invention consists in certain features of novelty in the construction, combination and arrangement of parts by which the said objects and certain other objects, hereinafter appearing are effected, all as fully described with reference to the accompanying drawings, and more particularly pointed out in the appended claims.

In the said drawings—

Figure 1:
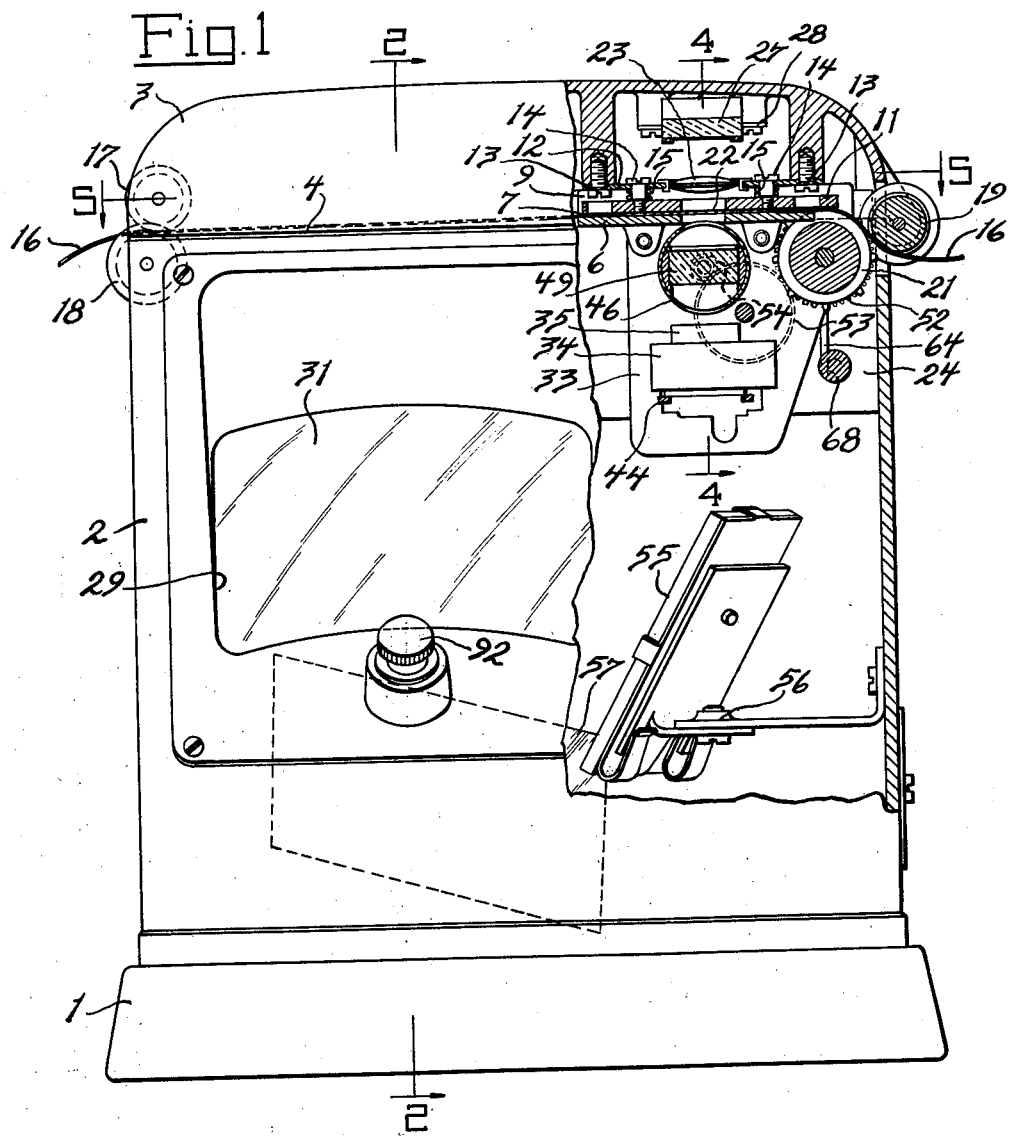
Figure 1 is a front elevation of a motion picture film viewer embodying my invention, with parts broken away and shown in section.

Referring to the drawings, a light enclosing casing comprises a horizontal base 1 and a hollow lower casing element 2 secured to the base and extending upwardly therefrom to form a lower casing part therewith, and a shallow downwardly flanged upper casing part or cover 3 above the casing element 2, thus forming the light enclosing casing, the parting plane of the lower and upper casing parts being horizontal and upwardly disposed as designated at 4. See Figures 1, 2 and 4. The upper casing part 3 is pivotally mounted on the lower casing element 2, as designated at 5, on a rearwardly disposed laterally extending horizontal axis adjacent the parting plane 4 for movement in a vertical plane into and out of closed position.

A laterally extending horizontal film strip exposure guide is arranged forwardly within the casing and is disposed substantially at and correspondingly with the parting plane 4 of the casing parts and parallel to the pivotal axis of the upper casing part 3, and comprises a horizontal lower film face guide member 6 secured on the casing element 2 and provided with an upwardly facing channel forming an upwardly facing film face guide 7 and film edge guides 8 and 9, and a downwardly facing film face guide member 11 mounted on the upper casing part 3 for movement therewith. The guide member 11 is mounted on the upper casing part 3 by means of a horizontal plate 12 secured within this casing part as designated at 13, headed and shouldered screw studs 14 slidably engaged in and extending downwardly through apertures in the plate 12 and secured with the guide member 11, and coiled springs 15 engaged on the screw studs between the plate 12 and guide member 11 to yieldably urge the guide member 11 downwardly as limited by the screws 14.

Figure 2:
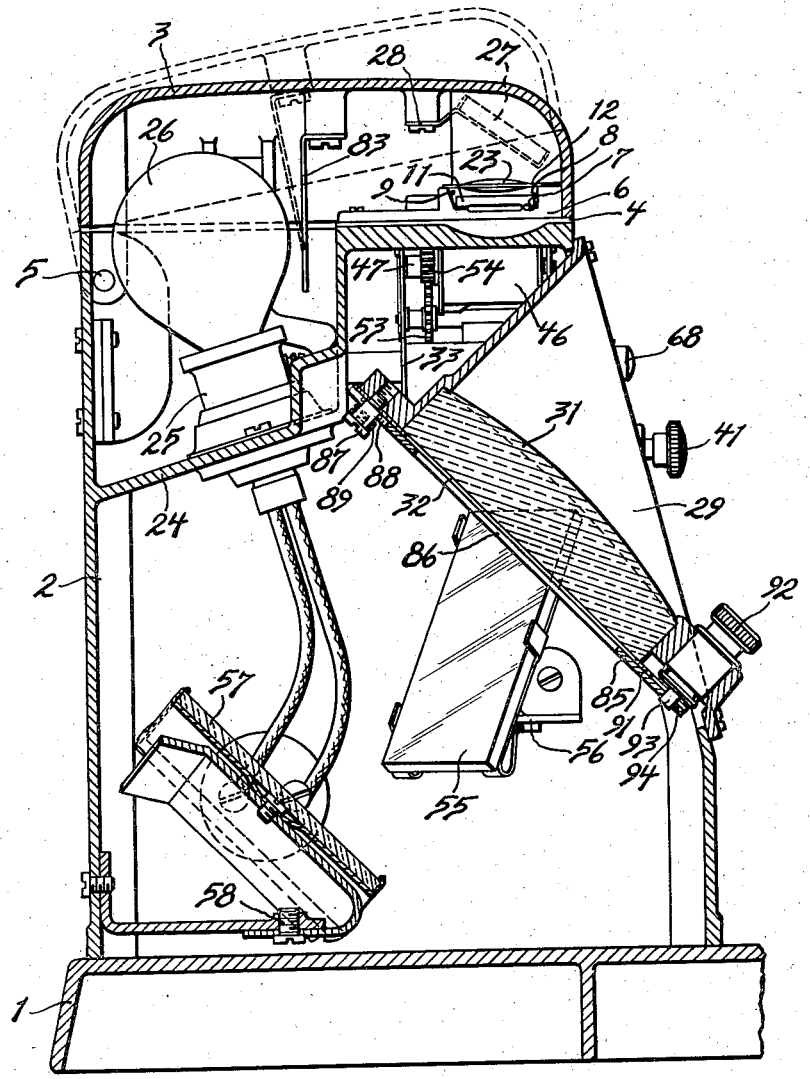
Figure 2 is a sectional view substantially on the line 2—2 of Figure 1.
Figure 4:
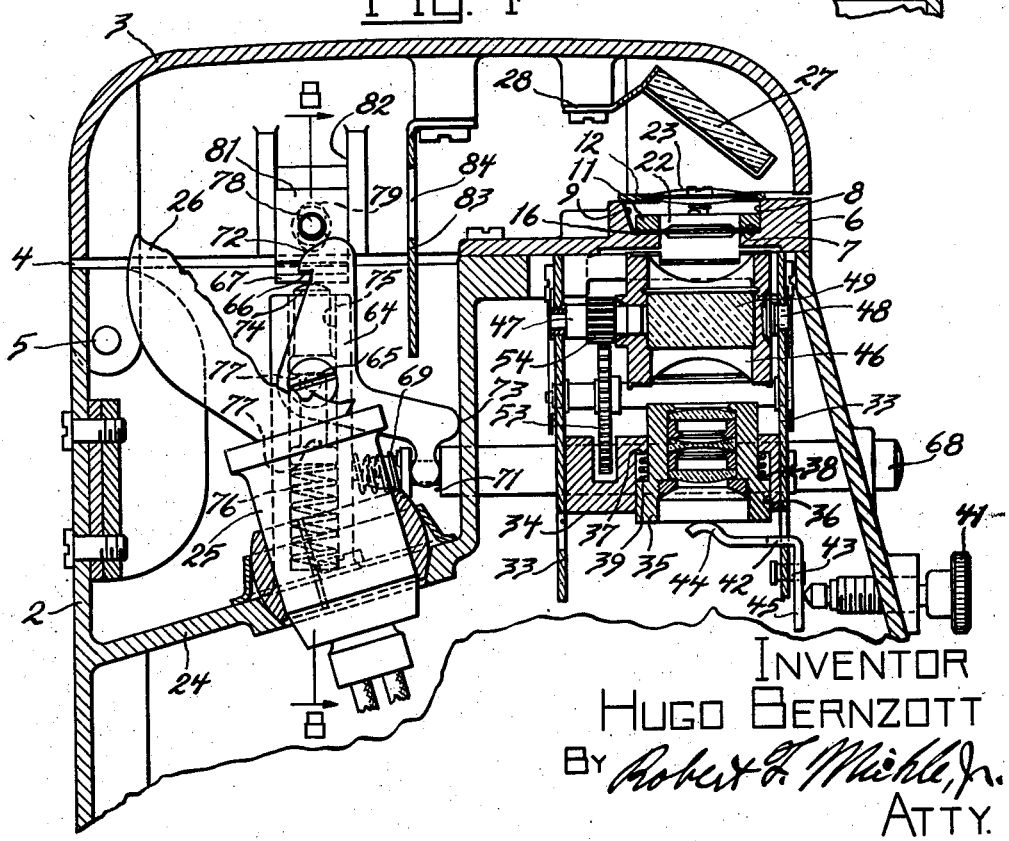
Figure 4 is a partial sectional view substantially on the line 4—4 of Figure 1.

When the upper casing part 3 is in its lower or closed position, as shown in Figures 1, 2 and 4, the guide members 6 and 11 are adapted to horizontally position a motion picture film strip 16 therebetween upwardly within the casing for movement of the film strip therethrough in parallelism with the pivotal axis of the upper casing part 3 and in the region of and correspondingly with the parting plane 4 of the upper and lower casing parts. When the upper casing part 3 is raised from its lower or closed position to an upper or open position, as indicated in broken lines in Figure 2, the upper guide member 11 is moved upwardly therewith to open the exposure guide for insertion and removal of the film, the guide being accessible when the upper casing part is in open position.

The film strip 16 extends outwardly from the casing at opposite sides thereof at the parting of the upper and lower casing parts for progressing the film through the exposure guide, and for guiding the film into and out of the casing a pair of cooperating revoluble guide rollers 17 and 18 are mounted respectively on the upper and lower casing parts at one side thereof and beyond one end of the exposure guide and a second pair of cooperating revoluble guide rollers 19 and 21 are mounted respectively on the upper and lower casing parts at the other side thereof and beyond the other end of the exposure guide, the film extending between these rollers for guidance and the rollers 17 and 19 moving upwardly with opening movement of the upper casing part to separate them from the rollers 18 and 21 for insertion and removal of the film.

The exposure guide is provided with a vertical exposure aperture 22 therethrough, and a condensing lens 23 is mounted on the plate 12 above the guide member 11 and in alinement with the exposure aperture 22. The casing element 2 is provided with a transverse upwardly disposed light baffle wall 24, and an upwardly facing lamp socket 25 is mounted on a depression of this wall rearwardly of the exposure guide. An upwardly extending incandescent electric lamp 26 is mounted on the socket 25 above the baffle wall at the side of the exposure guide. A reflector 27 is mounted on and within the upper casing part, as designated at 28, and is disposed above the exposure guide and the condensing lens 23 and is disposed to reflect light from the lamp downwardly through the condensing lens, the exposure aperture 22 and the film thereat to illuminate the film for viewing.

The front wall of the casing element 2 of the lower casing part is provided with an inwardly flanged opening 29, and a plano-spherical magnifying lens 31 is secured in and extends across the opening 29 in a position inclining upwardly and rearwardly for convenient viewing from the front of the casing. The flat face of this lens, designated at 32, is disposed inwardly and is ground in the usual manner to form a translucent image receiving surface.

Spaced parallel vertical frame plates 33 are secured within the casing element 2 and extend downwardly therein, and a horizontal frame block 34 extends between these frame plates and is secured therewith in downwardly spaced relation with the exposure guide. A vertically disposed projection lens 35, within the lower casing part below the film guide and alined with the exposure aperture 22, is mounted for vertical movement in a bore 36 through the block 34, see Figures 1 and 4.

The bore 36 is provided with a downwardly facing shoulder 37 and the barrel of the lens 35 is provided with an upwardly facing shoulder 38, and a compression spring 39 encircles the lens barrel and engages the shoulders 37 and 38 to yieldably urge the lens downwardly. A horizontally disposed adjustment screw 41 is screw-threaded through the front wall of the casing element 2, and a bell crank lever 42 is intermediately pivoted on a stud 43 on the lower end of the forward frame plate 33. A horizontal arm 44 of the bell crank lever is forked and engages upwardly against the lower end of the barrel of the lens 35, and a vertical downwardly extending arm 45 of the bell crank lever is engaged against the inner end of the adjustment screw 41 for effecting, in cooperation with the spring 39, vertical focusing adjustment of the lens 35 from the exterior of the casing.

Arranged between the projection lens 35 and the exposure aperture 22 of the exposure guide and within the lower casing part, is a horizontally disposed revoluble light shutter of the barrel type, generally designated at 46, and provided with axial spindle ends 47 and 48 journaled respectively in the frame plates 33, and also provided with a diametrically disposed transparent parallel surfaced refraction block 49 to stabilize an image projected through the shutter during the open periods of the shutter.

The guide roller 21 is provided with sprocket teeth 51 to form a sprocket, and these teeth are engageable in usual feed perforations of the film 16 to positively rotate the sprocket roller 21 as the film is drawn through the exposure guide. See Figure 1. A spur gear 52 is fixed on the sprocket roller 21, and a gear 53 is rotatably mounted on the frame plates 33 and meshes with the gear 52 and with a gear 54 fixed on the spindle end 47 of the shutter 46 whereby the shutter is driven from the sprocket roller 21 in timed relation with movement of the film through the exposure guide.

A reflector 55 is mounted within the casing element 2, as designated at 56, below the projection lens 35, and a second reflector 57 is mounted within the casing element 2, as designated at 58, to the rear of the lens 31. See Figures 1 and 2. The reflectors 55 and 57 are so angled that an illuminated image from the film at the exposure aperture 22 is projected downwardly through the shutter 46 and the projection lens 35 to the reflector 55 from which it is directed to the reflector 57 which directs the image to the translucent image receiving inner face 32 of the lens 31 through which the image is viewed from the exterior of the casing. The reflectors 55 and 57 form a circuitous light path within the lower casing part between the exposure aperture 22 and the image receiving face 32 of the lens 31 whereby a relatively long projection throw is obtained within the relatively compact lower casing part.

Figure 3:
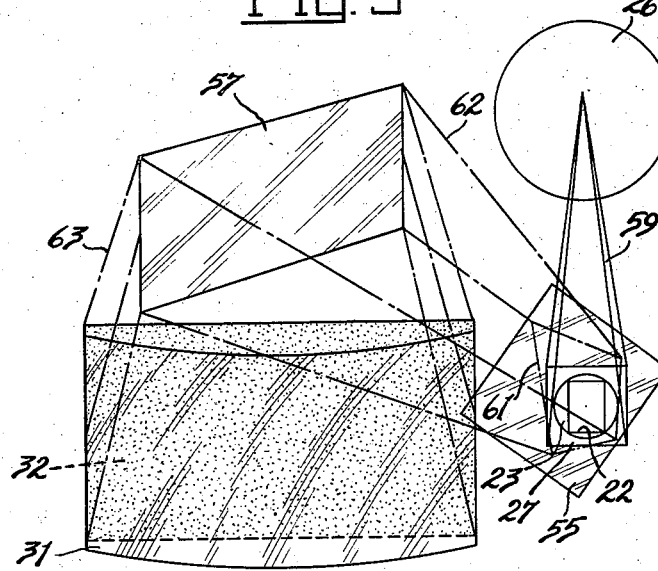
Figure 3 is a diagrammatic view of the optical elements of the device taken in plan.

Figure 3 illustrates diagrammatically the light path from the lamp 26 to the lens 31, in which 59 indicates the light path from the lamp 26 to the reflector 27, 61 indicates the light path downwardly from the reflector 27 through the exposure aperture 22 and the film thereat, the shutter 46 and the projection lens 35 to the reflector 55, 62 indicates the light path from the reflector 55 to the reflector 57, and 63 indicates the light path from the reflector 57 to the image receiving surface 32 of the lens 31.

Figure 5:
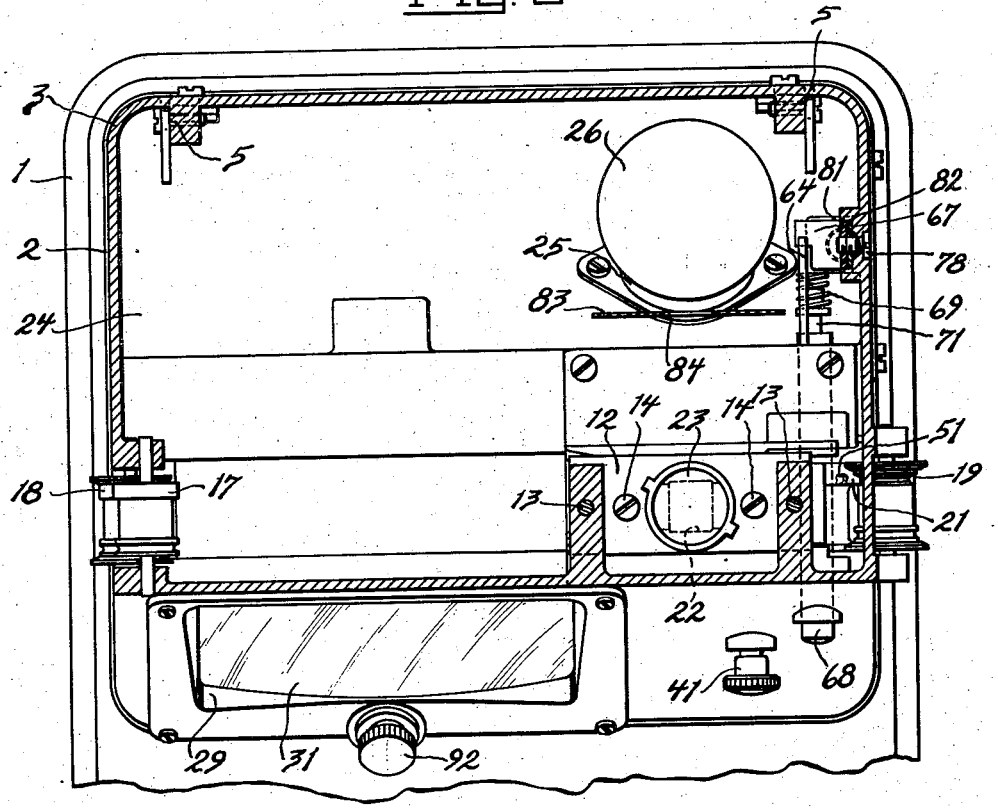
Figure 5 is a sectional view substantially on the line 5—5 of Figure 1.

The upper casing part 3 is releasably secured in its closed or lower position in the following manner. See Figures 4 and 5. A latch member 64 within the lower casing element 2 is intermediately pivoted thereon by means of a horizontally disposed headed and shouldered screw 65 screw-threaded in to the casing element 2. The upper end of the latch member is provided with a downwardly facing latch shoulder 66 which is engageable over a latch member 67 within and secured on the upper casing part 3 for securing the upper casing part in its closed position.

A forwardly extending horizontal plunger 68 is slidably mounted within the casing element 2 and projects from the front wall thereof for manual actuation, and a spring 69 yieldably urges this plunger forwardly. The inner end portion of the plunger 68 is provided with a circumferential groove 71 in which the lower end of the latch member 64 is engaged for movement with the plunger.

The spring 69 actuates the plunger 68 forwardly and the latch member 64 into latching position, the upper end of the latch member being provided with a cam formation 72 engageable with the latch member 67 for automatically engaging the latch members with closure of the upper casing part and latching movement of the latch member 64 being limited by a stop portion 73 on the lower end of this latch member engaging against the baffle wall 24. The upper casing part 3 is conveniently released for opening movement by pushing the plunger 68 rearwardly.

Figure 8:
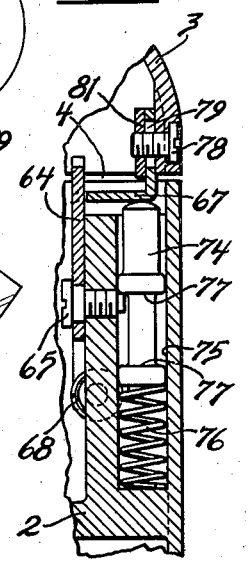
Figure 8 is a partial sectional view substantially on the line 8—8 of Figure 4.

The upper casing part 3 is yieldably urged upwardly from its closed position in the following manner. See Figures 4 and 8. A vertically disposed plunger 74 is slidably mounted in a vertical bore 75 of and within the casing element 2, and a spring 76 within this bore below the plunger 74 yieldably urges the plunger upwardly. Upward and downward movement of the plunger 74 is limited by the inner end of the screw 65 projecting into the bore 75 and between opposing shoulders 77 on the plunger 74.

The upper end of the plunger 74 is engageable upwardly against the latch member 67 of the upper casing part 3 so that the spring 76 actuates this casing part upwardly upon release of the latch members 64 and 67. The lower shoulder 77 of the plunger 74 engages the screw 65 to limit upward movement of the upper casing part 3 by the spring 76 to position the upper casing part in an intermediate open position, as shown in broken lines in Figure 2, in which position the film may be conveniently installed or removed, the upper casing part serving in this position to partially shield the lamp 26. However, by reason of the plunger 74 having abutting engagement with the latch member 67, the upper casing part may be moved from its intermediate open position to a fully open position, as for servicing or cleaning.

The upper shoulder 77 of the plunger 74 engages the screw 65 to form a stop determining the closed position of the upper casing part 3 and for the purpose of adjusting the closed position of the upper casing part the latch member 67 is adjustably mounted on the upper casing part 3 by means of a headed screw 78 extending through a vertical slot 79 through the latch member 67 and screw threaded into a nut 81 to adjustably secure this latch member in a vertical channel 82 on the upper casing part 3, it being observed that such adjustment of the latch member 67 corresponds to the latching of the latch members 64 and 67 with the adjusted closed position of the upper casing part.

A light mask in the form of a plate 83 provided with a light opening 84, alined with the lamp 26 and the reflector 27, is secured within and on the upper casing part 3 and is disposed between the lamp 26 and the reflector 27. The light opening 84 provides for the transmission of light from the lamp 26 to the reflector 27, but the mask shields the light from the lamp when the upper casing part 3 is in its aforesaid intermediate or film removing and installing position, as shown in broken lines in Figure 2, to the end that the user is not annoyed by direct light from the lamp, the reflector 27 directing light downwardly for removing or installing the film 16.

Figure 6:
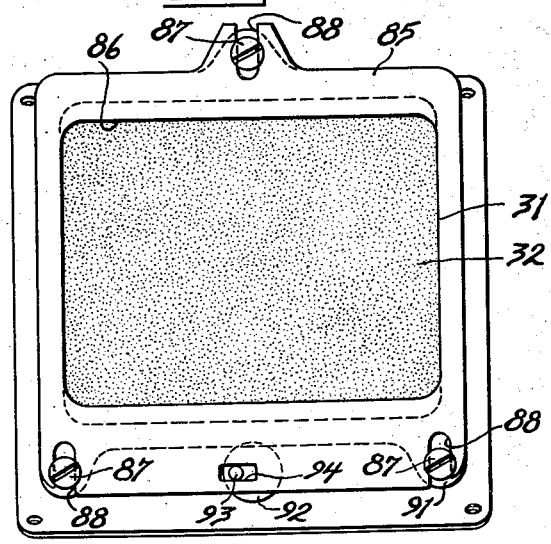
Figure 6 is an internal plan view of the masking device, hereinafter described.
Figure 7:
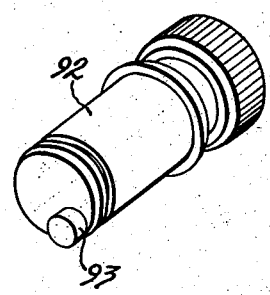
Figure 7 is a perspective view of the eccentric adjusting member of the aforesaid masking device.

In order to frame the projected image on the image receiving surface 32 of the lens 31, a framing mask plate 85, provided with a masking aperture 86, is adjustably mounted at or immediately inward of the image receiving surface 32 of the lens 31, see Figures 2, 6 and 7. The adjustable mounting of this mask plate comprises headed and shouldered screws 87 screwthreaded into the casing element 2 and slidably engaged in parallel slots 88 in the mask plate, compression springs 89 on the screws 87 serving to maintain the mask plate against an apertured mounting plate 91 for the lens 31.

A headed stud shaft 92 extends through and is rotatably mounted on the front wall of the casing element 2 and is provided with an inner eccentric stud 93 which is engaged in a slot 94 in the mask plate 85 extending normal to the mounting slots 88, whereby the mask plate may be adjusted for framing the image on the image receiving surface 32 from the exterior of the casing.

While I have thus described my invention, I do not wish to be limited to the precise details described as changes may be readily made without departing from the spirit of my invention, but having thus described my invention I claim as new and desire to secure by Letters Patent the following:

1. In a viewing device, the combination with a light enclosing casing, of means therein for releasably positioning an image bearing member in an upwardly disposed horizontal plane, means in said casing for illuminating said positioned image bearing member comprising a light source disposed below said image bearing member and out of illuminating relation with said image bearing member and a reflector above said image bearing member for reflecting light from said light source downwardly through said image bearing member, a translucent image receiving element on and extending across an opening in said casing below said positioning means, and means within said casing below said image bearing member for projecting an illuminated image from said image bearing member to said receiving element comprising a vertically disposed projection lens below said image bearing member and a plurality of reflecting members forming a circuitous light path from said projection lens to said receiving element.

2. In a viewing device, the combination with a light enclosing casing, of means therein for releasably positioning an image bearing member in an upwardly disposed horizontal plane, means disposed upwardly in said casing for illuminating said positioned image bearing member comprising a light source laterally displaced from said image bearing member and a reflector above said image bearing member for reflecting light from said light source downwardly through said image bearing member, a magnifying lens on and extending across an opening in the front wall of said casing below said positioning means and inclined upwardly and rearwardly and having the inner face thereof flat and ground to provide a translucent image receiving surface, means within said casing below said image bearing member for projecting an illuminated image from said image bearing member to said receiving element comprising a vertically disposed projection lens below said image bearing member and a plurality of reflecting members forming a circuitous light path from said projection lens to said receiving surface, and a light baffle in said casing between said light source and said projection means.

3. In a viewing device, the combination with a light enclosing casing comprising a lower part and an upper part mounted on said lower part for pivotal movement in a vertical plane into and out of closed position, means within said casing for releasably positioning an image bearing member in an upwardly disposed horizontal plane comprising cooperating positioning elements carried respectively by said lower and upper parts, means in said casing for illuminating said positioned image bearing member comprising a light source mounted on said lower part out of illuminating relation with said image bearing member and a reflector mounted on said upper part above said image bearing member for reflecting light from said light source downwardly through said image bearing member, means on said lower casing part for viewing an illuminated image of said image bearing member, and a light mask on said upper part and restricting light from said light source.

4. In a viewing device, the combination with a light enclosing casing comprising two parts one of which is mounted with respect to the other part for movement into and out of closed position, of a film strip exposure guide within said casing and disposed in the region of and correspondingly with the parting plane of said casing parts and comprising cooperating film face guide elements carried respectively by said casing parts, and film strip guide means disposed at the parting of said casing parts beyond opposite ends of said guide for guiding a strip into and out of said casing and comprising cooperating guide elements carried respectively by said casing parts and one of which guide elements comprising a revoluble sprocket engaging feed perforations of the film strip, a light shutter within said casing cooperatively related with said exposure guide, and means for driving said shutter from and in timed relation with said sprocket.

5. In a viewing device, the combination with a light enclosing casing comprising a lower part and an upper part mounted on said lower part for movement in a vertical plane into and out of closed position, of a film strip exposure guide within said casing and disposed in the region of and correspondingly with the parting plane of said casing parts and comprising cooperating film face guide elements carried respectively by said casing parts, film strip guide means disposed at the parting of said casing parts beyond opposite ends of said guide for guiding a film strip into and out of said casing and comprising cooperating guide elements carried respectively by said casing parts, means in said casing for illuminating said film strip at said exposure guide comprising a light source mounted on said lower part out of illuminating relation with said exposure guide and a reflector mounted on said upper part above said exposure guide for reflecting light from said light source downwardly through said film strip, and means on said lower casing part for viewing an illuminated image of said film strip.

6. In a viewing device, the combination with a light enclosing casing comprising a lower part and an upper part mounted with respect to the lower part for pivotal movement in a vertical plane into and out of closed position, of a film strip exposure guide within said casing and disposed in the region of and correspondingly with the parting plane of said casing parts and parallel to the pivotal axis of said upper part and comprising cooperating film face guide elements carried respectively by said casing parts, film strip guide means disposed at the parting of said casing parts beyond opposite ends of said guide for guiding a film strip into and out of said casing comprising cooperating guide elements carried respectively by said casing parts, means in said casing for illuminating said film strip at said exposure guide comprising a light source carried by said lower casing part out of illuminating relation with said exposure guide and a reflection mounted on said upper part above said exposure guide for reflecting light from said light source downwardly through said film strip, a translucent image receiving element on and extending across an opening in said lower casing part, and means within said lower casing part for projecting an illuminated image from said film strip to said receiving element comprising reflecting means forming a circuitous light path from said film strip.

7. In a viewing device, the combination with a light enclosing casing comprising a lower part and an upper part mounted with respect to the lower part for pivotal movement in a vertical plane into and out of closed position, of a film strip exposure guide within said casing and disposed in the region of and correspondingly with the parting plane of said casing parts and parallel to the pivotal axis of said upper part and comprising cooperating film face guide elements carried respectively by said casing parts, film strip guide means disposed at the parting of said casing parts beyond opposite ends of said guide for guiding a film strip into and out of said casing comprising cooperating guide elements carried respectively by said casing parts and one of which guide elements is mounted on said lower part and comprises a revoluble sprocket engaging feed perforations of the film strip, a revoluble light shutter mounted within said lower part below and in cooperative relation with said exposure guide, means for driving said shutter from and in timed relation with said sprocket, a translucent image receiving element on and extending across an opening in said lower casing part, and means within said lower casing part for projecting an illuminated image from said film strip to said receiving element comprising a projection lens and reflecting means forming a circuitous light path.

HUGO BERNZOTT.